(12) United States Patent
Kodama et al.

(10) Patent No.: US 8,571,206 B2
(45) Date of Patent: Oct. 29, 2013

(54) INFORMATION TRANSMITTING APPARATUS, INFORMATION TRANSMITTING METHOD, AND COMPUTER PRODUCT

(75) Inventors: Tetsuhiro Kodama, Kawasaki (JP); Jun Yajima, Kawasaki (JP); Arata Noguchi, Kawasaki (JP); Ken Sakuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 838 days.

(21) Appl. No.: 12/073,715

(22) Filed: Mar. 7, 2008

(65) Prior Publication Data

US 2008/0219435 A1 Sep. 11, 2008

(30) Foreign Application Priority Data

Mar. 7, 2007 (JP) .................. 2007-057221

(51) Int. Cl.
*H04L 29/06* (2006.01)
(52) U.S. Cl.
USPC .......................................................... 380/28
(58) Field of Classification Search
USPC .......................................................... 380/28
See application file for complete search history.

(56) References Cited

U.S. PATENT DOCUMENTS

| 6,310,893 | B1 | 10/2001 | Yuan et al. | |
|---|---|---|---|---|
| 7,003,667 | B1 * | 2/2006 | Slick et al. | 713/182 |
| 2002/0112152 | A1 * | 8/2002 | VanHeyningen et al. | 713/151 |
| 2002/0122420 | A1 | 9/2002 | Yuan et al. | |
| 2003/0016829 | A1 * | 1/2003 | Chu | 380/281 |
| 2004/0193876 | A1 * | 9/2004 | Donley et al. | 713/162 |
| 2004/0225885 | A1 * | 11/2004 | Grohoski et al. | 713/189 |
| 2005/0157871 | A1 * | 7/2005 | Komano et al. | 380/28 |
| 2009/0122717 | A1 * | 5/2009 | Das et al. | 370/253 |

FOREIGN PATENT DOCUMENTS

| JP | 2002-518933 | 6/2002 |
|---|---|---|
| JP | 2004-364022 | 12/2004 |
| JP | 2006-041684 | 2/2006 |

OTHER PUBLICATIONS

Japanese Office Action for corresponding Japanese Application 2007-057221; mailed Apr. 26, 2011.

* cited by examiner

*Primary Examiner* — Michael S McNally
(74) *Attorney, Agent, or Firm* — Staas & Halsey LLP (57) ABSTRACT

An information transmitting apparatus encrypts and transmits transmit data that includes contents for which transmission instruction has been received, an authentication code, and padding. The information transmitting apparatus includes a padding calculating unit that calculates a size of the padding based on an encrypting algorithm, a size of the authentication code and a size of the contents; a transmit-data size calculating unit that calculates a size of the transmit data from the size of the padding, the size of the authentication code, and the size of the contents; a generating unit that generates, using the size of the transmit data, a header that indicates a type of the transmit data and the size of the transmit data; an encrypting unit that encrypts the transmit data; and a transmitting unit that transmits the header and the encrypted transmit data.

16 Claims, 7 Drawing Sheets

INFORMATION TRANSMITTING APPARATUS, INFORMATION TRANSMITTING METHOD, AND COMPUTER PRODUCT

CROSS-REFERENCE TO RELATED APPLICATIONS

This application is based upon and claims the benefit of priority from the prior Japanese Patent Application No. 2007-057221, filed on Mar. 7, 2007, the entire contents of which are incorporated herein by reference.

BACKGROUND OF THE INVENTION

1. Field of the Invention

The present invention relates to technology for telecommunication using cryptography.

2. Description of the Related Art

Conventionally, to securely transmit and receive private information, including personal information, trade secrets, etc., over a network such as the Internet, protocols are used such as Secure Socket Layer (SSL) and Transport Layer Security (TLS) in which the information is transmitted and received after encryption.

Recently in communication involving SSL, to reduce delay caused by the time required for the assembly of encrypted data from Transmission Control Protocol (TCP) packets, the transmitted packets into which the data is divided are sequentially decrypted at the time of decryption at reception. Furthermore, it has been proposed that at the time of encryption for transmission, data in the application layer be divided in such a manner that the divided data may be transferred in one TCP packet after block-ciphering (see, for example, Japanese Patent Application Laid-Open Publication No. 2004-364022).

In the case of transmitting and receiving contents using protocols such as SSL and TLS, usually transmit data (data that is to be transmitted and generated by processing the contents according to such procedures as shown in (1) to (4) below) is transmitted to a destination server or client.

Figure 1:
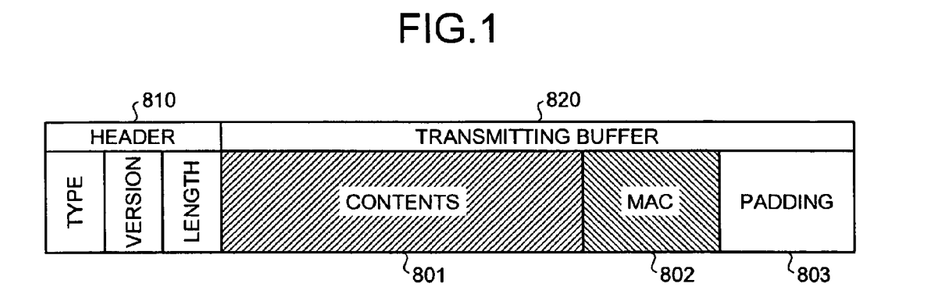
FIG. 1 is a schematic of a conventional method of generating transmit data.

(1) Generation of a Message Authentication Code (MAC)
(2) Padding processing, as required
(3) Encryption of the transmit data including the contents, the MAC, and the padding
(4) Generation of a header of the transmit data FIG. 1 is a diagram of an example of a conventional method of generating transmit data. As shown in FIG. 1, the transmit data is stored in a transmitting buffer 820 and includes contents 801, a MAC 802, and padding 803.

The contents 801 are the data of the contents to be transmitted. The MAC 802 is an authenticator that authenticates the transmit data (i.e., verifies that the data has not been altered) and the sender (i.e., verifies the identity of the sender), and specifically, is a MAC value, etc., generated by, for example, a MAC generating algorithm. The padding 803 is data for padding the encrypted part such that the resulting size will be equal to a multiple of a block used for block-ciphering in a given encrypting algorithm.

The header 810 carries a description indicating attributes of the transmit data temporarily stored by the transmitting buffer 820 and includes, for example, "type" indicating the type of the contents 801, "version" indicating the version of the protocol used for transmitting and receiving, and "length" indicating the size of the transmit data.

The header 810 is information that is required at the time of transmitting or receiving the data and is generated after the generation of the MAC 802, the generation of the padding 803 by the padding processing, and the encryption of the transmit data.

However, the conventional technology mentioned above is configured such that at the time of transmission of the transmit data, the header, which is to be transmitted first, is not generated until after the processing and generation of the transmit data, thereby necessitating a transmitting buffer that is capable of storing the transmit data until the header generation is completed. Namely, to accommodate the transmit data whose data size varies depending on the data size of the MAC and the padding, a transmitting buffer must be prepared that has a maximum size (for example, approximately 16 Kbytes) specified by the standard.

Therefore, in the case that a memory area of a built-in memory is allocated as the transmitting buffer, if there is a limitation to the minimum size of the memory area, the memory area is pressed by the transmitting buffer. In particular, when the data size of the transmit data is small and the transmit data can be held by a transmitting buffer of a small size, there is a problem of inefficient use of the memory since a certain area, even if not used for the transmitting buffer, must be secured as the transmitting buffer in the memory area.

On the other hand, in the case of preparing the transmitting buffer of a small size, there is a problem in that transmit data of a size larger than that of the transmitting buffer can not be transmitted.

SUMMARY OF THE INVENTION

According to one aspect of the embodiment, an information transmitting apparatus encrypts according to a given encrypting algorithm, and transmits to a destination, transmit data that includes contents for which transmission instruction has been received, an authentication code that authenticates the contents and a sender of the contents, and padding. The apparatus includes a padding calculating unit that calculates a size of the padding based on the encrypting algorithm, a size of the authentication code and a size of the contents; a transmit-data size calculating unit that calculates a size of the transmit data from the size of the padding, the size of the authentication code, and the size of the contents; a generating unit that generates, using the size of the transmit data, a header that indicates a type of the transmit data and the size of the transmit data; an encrypting unit that encrypts the transmit data; and a transmitting unit that transmits, to the destination, the header and the encrypted transmit data.

According to another aspect of the embodiment, an information transmitting method is for encrypting according to a given encrypting algorithm, and transmitting to a destination, transmit data that includes contents for which transmission instruction has been received, an authentication code that authenticates the contents and a sender of the contents, and padding. The method includes calculating a size of the padding based on the encrypting algorithm, a size of the authentication code and a size of the contents; calculating a size of the transmit data from the size of the padding, the size of the authentication code, and the size of the contents; generating, using the size of the transmit data, a header that indicates a type of the transmit data and the size of the transmit data; encrypting the transmit data; and transmitting, to the destination, the header and the encrypted transmit data.

According to yet another aspect of the embodiment a computer-readable recording medium stores therein an information transmitting program for encrypting according to a given encrypting algorithm, and transmitting to a destination, transmit data that includes contents for which transmission instruction is received, an authentication code that prevents the contents from being altered and a sender of the contents from being disguised as a different person, and padding. The program causes a computer to execute calculating a size of the padding based on the encrypting algorithm, a size of the authentication code and a size of the contents; calculating a size of the transmit data from the size of the padding, the size of the authentication code, and the size of the contents; generating, using the size of the transmit data, a header that indicates a type of the transmit data and the size of the transmit data; encrypting the transmit data; and transmitting, to the destination, the header and the encrypted transmit data.

DETAILED DESCRIPTION OF THE PREFERRED EMBODIMENTS

Referring to the accompanying drawings, exemplary embodiments according to the present invention are explained in detail below.

Figure 2:
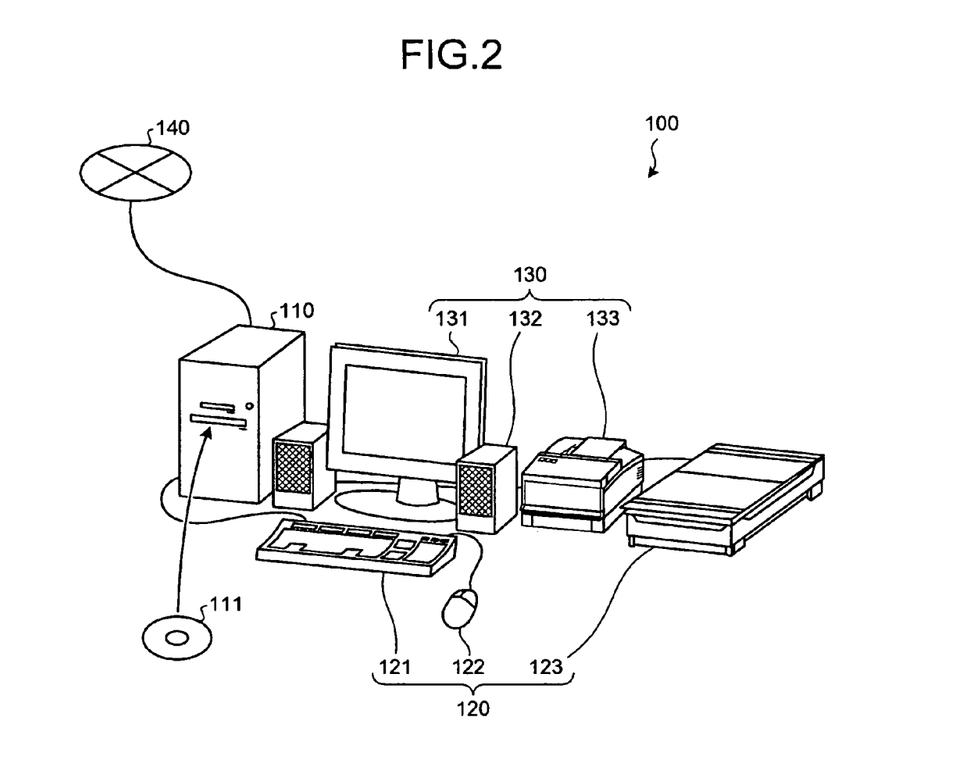
FIG. 2 is a block diagram of an information transmitting apparatus according to a first embodiment of the present invention.

FIG. 2 is a block diagram of an information transmitting apparatus according to the first embodiment of the present invention. As shown in FIG. 2, an information transmitting apparatus 100 includes a computer 110, an input device 120, and an output device 130, and can be connected with a network 140, e.g., a LAN, a WAN, or the Internet through a non-depicted router or a modem.

The computer 110 includes a CPU, a memory, and an interface. The CPU controls the entire information transmitting apparatus 100. The memory is formed of, for example, read-only memory (ROM), a random access memory (RAM), a hard disk (HD), an optical disk 111, or a flash memory. The memory is used as a work area for the CPU.

Various programs are stored in the memory and loaded in response to a command from the CPU. The reading/writing data from/into the HD and the optical disk 111 is controlled by a disk drive. The optical disk 111 and the flash memory are removable. The interface controls input from the input device 120, output to the output device 130, and transmission/reception with respect to the network 140.

As the input device 120, a keyboard 121, a mouse 122, and a scanner 123 are adopted. The keyboard 121 includes keys to input, for example, characters, numeric figures, and various kinds of instructions, and data is input through the keyboard 121. The keyboard 121 may be a touch panel type. The mouse 122 is used to move a cursor, select a range, move a window, or change a window size. The scanner 123 optically reads an image as image data, which is stored in the memory of the computer 110. The scanner 123 may have an optical character recognition (OCR) function.

As the output device 130, a display 131, a speaker 132, a printer 133, and others are adopted. The display 131 displays a cursor, an icon, or a tool box as well as data, such as text, an image, and function information. The speaker 132 outputs sound, e.g., a sound effect or a text-to-voice converted sound. The printer 133 prints image data or text data.

Figure 3:
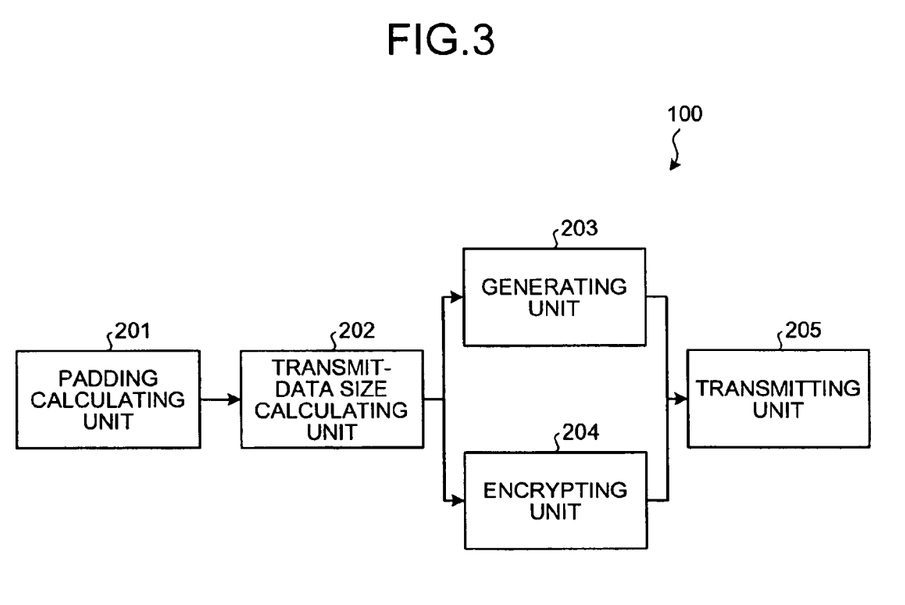
FIG. 3 is a functional diagram of the information transmitting apparatus according to the first embodiment.

FIG. 3 is a functional diagram of the information transmitting apparatus according to the first embodiment. As shown in FIG. 3, the information transmitting apparatus 100 includes a padding calculating unit 201, a transmit-data size calculating unit 202, a generating unit 203, an encrypting unit 204, and a transmitting unit 205. The information transmitting apparatus 100, using a given encrypting algorithm, encrypts transmit data, which includes the contents for which transmission instruction has been received, an authentication code that authenticates the contents and the sender, and padding. The information transmitting apparatus 100 transmits the encrypted transmit data to a destination.

The respective functions of the units 201 to 205 can be implement by causing the CPU to execute a corresponding program stored in the memory. Output data from the respective units 201 to 205 is stored in the memory. Corresponding to the connection destinations, indicated by the arrows in FIG. 3, the CPU reads the output data of the connection sources from the memory, and executes a corresponding program.

Configuration may be such that the contents are, for example, recorded on the HD or the optical disk 111 shown in FIG. 2 or acquired by way of the network 140. Configuration may be such that the transmit data is transmitted, for example, when the instruction to transmit the contents is received by the input device 120 shown in FIG. 2 or from the destination of the transmission.

The encrypting algorithm is, for example, Advanced Encryption Standard (AES). The CPU encrypts the transmit data, block by block, the block being a block unit respective to the encrypting algorithm. More specifically, for example, the encrypting processing of the transmit data is performed by the CPU, using the AES stored in the ROM or RAM and utilizing the memory as a work area.

The authentication code is the MAC for authenticating that, for example, the contents of the encrypted transmit data has not been altered by devices at the destination of transmission and that the sender is not disguised as a different person. Specifically, for example, the MAC is generated by the CPU, using a MAC generating algorithm. More specifically, for example, the generation of the MAC is performed by the CPU, using the MAC generating algorithm (for example, HMAC-SHA-1 or HMAC-MD5) stored in the ROM or RAM.

The data size of the MAC is, for example, specified by the MAC generating algorithm that generates the MAC and specifically, is 20 bytes in the case of using the HMAC-SHA-1 and 16 bytes in the case of using the HMAC-MD5.

The padding is, for example, data for padding so that at the time of encryption of the transmit data, the encrypted part will be of a size equal to a multiple of the block for the encryption.

The padding calculating unit 201 calculates the size of the padding based on the encrypting algorithm, the data size of the authentication code, and the contents.

While details will be described hereinafter with respect to FIGS. 4 and 5, the padding calculating unit 201, for example, divides the data size of the MAC and the contents by the block respective to the encrypting algorithm and then calculates the padding size so that a total data size including the MAC, the contents, and the padding will be a multiple (positive integer) of the block.

Specifically, for example, the padding calculating unit 201 causes the CPU to calculate the padding size and store the result in the memory with respect to the contents for which the transmission instruction has been received at the input device 120 shown in FIG. 2.

The transmit-data size calculating unit 202 calculates the transmit data size of the transmit data from the padding size calculated by the padding calculating unit 201, the data size of the MAC, and the contents.

Specifically, for example, the transmit-data size calculating unit 202 causes the CPU to calculate the transmit data size from the data size of the MAC specified by the MAC generating algorithm that generates the MAC, the data size of the contents for which transmission instruction has been received, and the padding size stored in the memory; and to store the calculated transmit data size in the memory.

The generating unit 203, using the transmit data size generated by the transmit-data size calculating unit 202, generates the header indicating the type of the transmit data and the transmit data size. Specifically, for example, the generating unit 203 causes the CPU to generate the header indicating the type of the contents for which the transmission instruction has been received and the transmit data size held in the memory, and to store the generated header in the memory. Namely, the header can be generated by accurately estimating the transmit data size, without necessarily storing all the transmit data in the transmitting buffer.

The encrypting unit 204 encrypts the transmit data. Specifically, for example, the encrypting unit 204 divides the transmit data so that each divided transmit data will be of a size smaller than the memory size of the transmitting buffer that temporarily stores the transmit data. Configuration is such that the size of each divided data is equal to the block respective to the encrypting algorithm. However, the size of the last data block is not required to be equal to the block.

While details will be described hereinafter using FIGS. 4 and 8, the transmitting buffer is, for example, stored in the memory and the encrypting unit 204 sequentially encrypts the divided transmit data. The encrypting unit 204 also encrypts the MAC and the padding.

More specifically, for example, the encrypting unit 204 causes the CPU to acquire the contents for which the transmission instruction has been received, store the contents (divided into the data blocks of the block) in the transmitting buffer, and sequentially encrypt the data blocks. Next, after the last data block, whose size is short of a full block, the encrypting unit 204 causes the CPU to generate the MAC using the MAC generating algorithm, store the MAC in the transmitting buffer, and encrypt the MAC. The encrypting unit 204 also causes the CPU to generate the padding, store the padding in the transmitting buffer, and encrypt the padding.

The transmitting unit 205 transmits the header generated by the generating unit 203 and the transmit data encrypted by the encrypting unit 204 to the destination. Specifically, for example, the transmitting unit 205 sequentially transmits the data blocks and the last data block sequentially encrypted by the encrypting unit 204. Next, the transmitting unit 205 sequentially transmits the MAC and the padding generated and sequentially encrypted by the encrypting unit 204. Configuration may be such that the transmitting unit 205 transmits the data blocks and the last data block after the transmission of the header.

More specifically, for example, configuration is such that the transmitting unit 205 causes the CPU to sequentially transmit the transmit data stored in the transmitting buffer to the destination. As described above, configuration such that the header of the transmit data is transmitted before the transmission of the transmit data and the transmit data is sequentially encrypted and transmitted and hence, it is not necessary to store all the transmit data in the transmitting buffer and the size of the transmitting buffer may be reduced.

Figure 4:
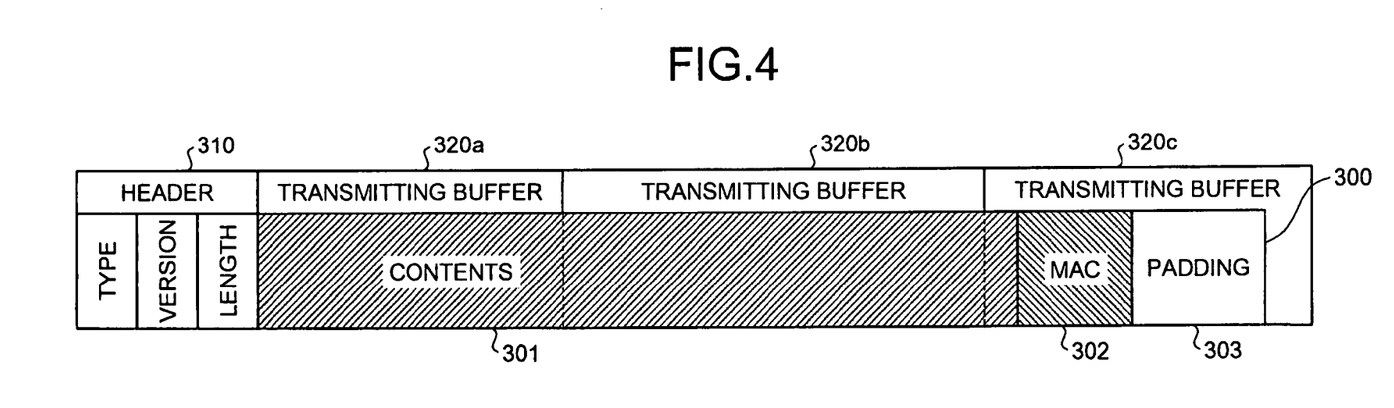
FIG. 4 is a schematic of the transmit data according to the first embodiment.

FIG. 4 is a schematic of the transmit data according to the first embodiment. As shown in FIG. 4, transmit data 300 includes contents 301, a MAC 302, and padding 303, and is stored in a transmitting buffer 320 (320a, 320b, 320c). A header 310 carries a description of the information indicating attributes of the transmit data 300 and includes, for example, "type" indicating the type of the contents 301, "version" indicating the version of the protocol used for transmitting and receiving, and "length" indicating the transmit data size.

The contents 301 are the data subject to transmission to the destination. Specifically, for example, configuration may be such that the contents are recorded on the HD or the optical disk 111 shown in FIG. 2 or are acquired by way of the network 140. Configuration may be such that the transmit data 300 is transmitted, for example, when the instruction to transmit the contents is received at the input device 120 shown in FIG. 2 or from the destination of the transmission.

The MAC 302 is an authenticator used for authenticating that the contents of the transmit data 300 have not been altered at the destination of transmission and that the sender is not disguised as a different person, and is a MAC value, etc., generated by a given MAC generating algorithm. The data size of the MAC 302 is, for example, specified by the MAC generating algorithm that generates the MAC 302 and specifically, is 20 bytes in the case of the HMAC-SHA-1 and 16 bytes in the case of the HMAC-MD5.

The padding 303 is data for padding so that at the time of encrypting the transmit data 300, the encrypted part will be of a size equal to a multiple of the block for a given encrypting algorithm. In other words, the padding 303 is, for example, the data used for padding so that the total size of the data including the MAC, the contents and the padding size will be a multiple (positive integer) of the block.

The transmitting buffer 320 transmits the transmit data 300 stored therein in plural divided transmissions to the destination. Specifically, for example, the information transmitting apparatus 100 copies, in portions equivalent to a multiple of the block, as much of the transmit data 300 as possible to the transmitting buffer 320 for encryption and transmission, and sequentially repeats this process. At the final stage, the contents 301 that do not fill the block, the MAC 302, and the padding 303 are copied to the transmitting buffer 320 and transmitted.

While details of the processing are described hereinafter with respect to FIGS. 6 and 7, the transmission of the transmit data 300 is performed, more specifically, for example, in such a manner that a part of the contents 301 is copied to the transmitting buffer 320a, encrypted, and transmitted to the destination and further, a part of the contents 301 is copied to the transmitting buffer 320b, encrypted, and transmitted to the destination. Then, at the final stage, a remaining part of the contents 301, the MAC 302, and the padding 303 are copied to the transmitting buffer 320c, encrypted, and transmitted to the destination.

According to the above configuration, the transmitting buffer 320 can be of a smaller size than that of the conventional technology and efficient memory usage can be achieved. Specifically, for example, when it is assumed that the block used by the AES is 16 bytes and that the data size of the MAC 302 generated using the HMAC-SHA-1 is 20 bytes, a minimum size of the transmitting buffer 320 may be only 48 bytes.

More specifically, for example, the minimum size of the transmitting buffer 320 is larger than a total value (36 bytes) of the block (16 bytes) and the data size of the MAC 302 (20 bytes) and is a minimum value divisible by the block, namely, 48 bytes. The padding size is arbitrarily selectable with an upper limit of 255 bytes and the first embodiment is configured to use a padding size of 1 to 16 bytes.

Figure 5:
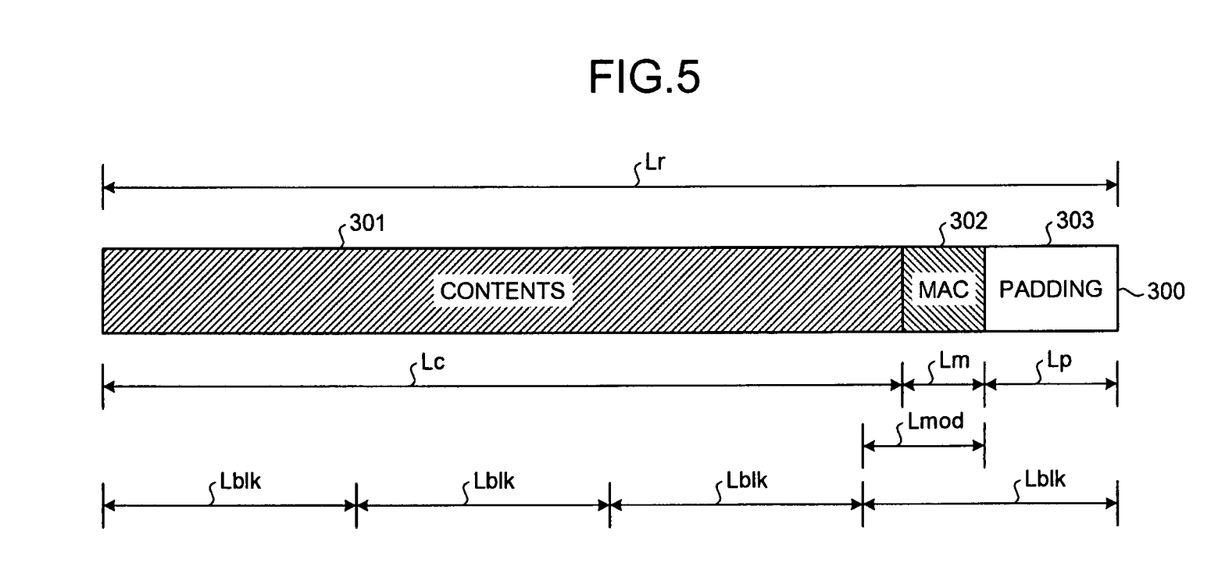
FIG. 5 is a schematic of calculation of the transmit data size according to the first embodiment.

FIG. 5 is a schematic of calculation of the transmit data size according to the first embodiment. As shown in FIG. 5, the transmit data size Lr of the transmit data 300 is a sum of the data size Lc of the contents 301, the data size Lm of the MAC 302, and the padding size Lp of the padding 303 and may be expressed by the following equation (1):

$$Lr=(Lc+Lm)+Lp \quad (1)$$

The padding size Lp is such that the data size of the transmit data 300 becomes equal to a multiple (positive integer) of the block. If the sum of the data size Lc of the contents 301 and the data size Lm of the MAC 302 is divided by the block Lblk and the remainder is given as Lmod, the minimally required padding size Lp may be expressed by the following equation (2):

$$Lp = Lblk - Lmod$$
$$= Lblk - (Lc + Lm) mod Lbkl \quad (2)$$

Therefore, from the equations (1) and (2) above, the transmit data size Lr of the transmit data 300 may be expressed by the following equation (3):

$$Lr=(Lc+Lm)+Lblk-(Lc+Lm)\mod Lblk \quad (3)$$

More specifically, when the contents 301 with the data size Lc of 40 bytes are encrypted by the AES and the MAC 302 is generated by the HMAC-SHA-1, the block Lblk is 16 bytes and the data size Lm of the MAC 302 is 20 bytes and, from equation (3), the transmit data size Lr is 64 bytes (40+20+16−(40+20)mod 16).

When the contents 301 with the data size Lc of 1000 bytes are encrypted by DES (Data Encryption Standard) and the MAC 302 is generated by the HMAC-MD5, the block Lblk is 8 bytes and the data size Lm of the MAC302 is 16 bytes and, from the equation (3), the transmit data size Lr is 1024 bytes (1000+16+8−(1000+16)mod 8).

As described above, by determining the block Lblk and the data size Lm of the MAC 302 from the encrypting algorithm used for the encryption and the HMAC generating algorithm with reference to the data size Lc of the contents 301, calculation may be made of the padding size Lp and the transmit data size Lr.

Namely, as the header may be generated by an accurate estimate of the transmit data size Lr using the transmitting buffer 320 prior to the transmission of the transmit data 300 to the destination, an efficient use of the memory can be achieved by setting an appropriate size for the transmitting buffer 320, thereby preventing the securing of an unnecessarily large size.

In the description of FIGS. 4 and 5, on the assumption that the header and the transmit data 300 are separately and independently transmitted, configuration is such that, after the transmission of the header, the transmit data 300 is sequentially transmitted, adjusted to the transmitting buffer 320. However, configuration may be such that the header as well is copied to the transmitting buffer 320 and the header together with the transmit data 300 is sequentially transmitted. In this case, the header is transmitted without encryption.

Figure 6:
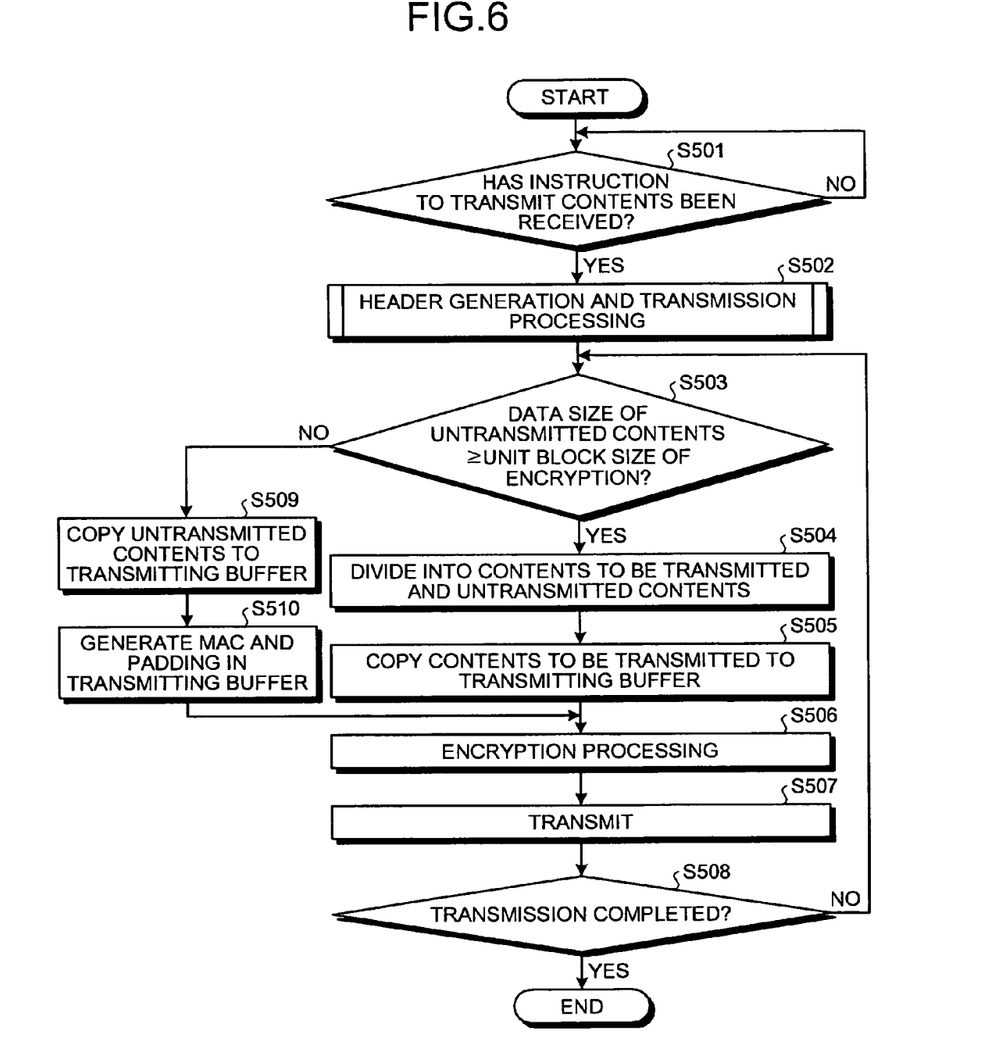
FIG. 6 is a flowchart of processing performed by the information transmitting apparatus according to the first embodiment.

FIG. 6 is a flowchart of processing performed by the information transmitting apparatus according to the first embodiment. In the flowchart shown in FIG. 6, firstly, it is judged whether the instruction to transmit the contents has been received by the input device 120 (step S501). Specifically, at step S501, waiting for the receipt of transmission instruction occurs (step S501: NO). When the transmission instruction is received (step S501: YES), the CPU performs the header generation and transmission processing for the transmit data of the contents corresponding to the transmission instruction received at step S501 (step S502). Configuration may be such that the header generation and transmission processing are performed, for example, using the transmit data size Lr calculated with respect to the transmit data 300 as shown in FIGS. 4 and 5 and details thereof are described hereinafter with reference to FIG. 7.

Next, the CPU judges whether the data size of the contents that remain untransmitted is equal to or greater than the block (step S503). At step S503, if the data size of the contents that remain untransmitted is equal to or greater than the block (step S503: YES), the CPU designates a portion of the untransmitted contents to be transmitted with the remaining untransmitted contents continued to be designated as untransmitted contents (step S504).

Specifically, for example, among the contents that remain untransmitted, the portion designated to be transmitted is of a size equal to a multiple of the block and of a maximum size with respect to that which can be accommodated in the transmitting buffer and the contents that remain are continued to be designated as untransmitted contents.

Next, the CPU copies the contents to be transmitted that are designated at step S504 to the transmitting buffer (step S505) and sequentially performs the encryption processing of the copied contents to be transmitted (step S506).

At step S503, if the data size of the untransmitted contents is smaller than the block (step S503: NO), then the untransmitted contents are copied to the transmitting buffer (step S509) and the MAC and the padding are generated in the transmitting buffer (step S510). Then, the CPU performs encryption processing of the untransmitted contents, the MAC, and the padding that are stored in the transmitting buffer (step S506).

The transmit data subject to the encryption processing at step S506 is transmitted by way of an interface (step S507). Specifically, for example, the transmit data stored in the transmitting buffer is sequentially transmitted to the destination specified by the transmission instruction received at step S501.

The CPU judges whether the transmission is finished (step S508) and if the transmission is not finished (step S508: NO), then the process returns to step S503 and the processing is repeated. Specifically, for example, the completion of the transmission is determined by judging whether all the transmit data, associated with the contents for which the transmission instruction has been received at step S501, has been transmitted.

At step S508, if the transmission is finished (step S508: YES), then a series of processing is ended.

Figure 7:
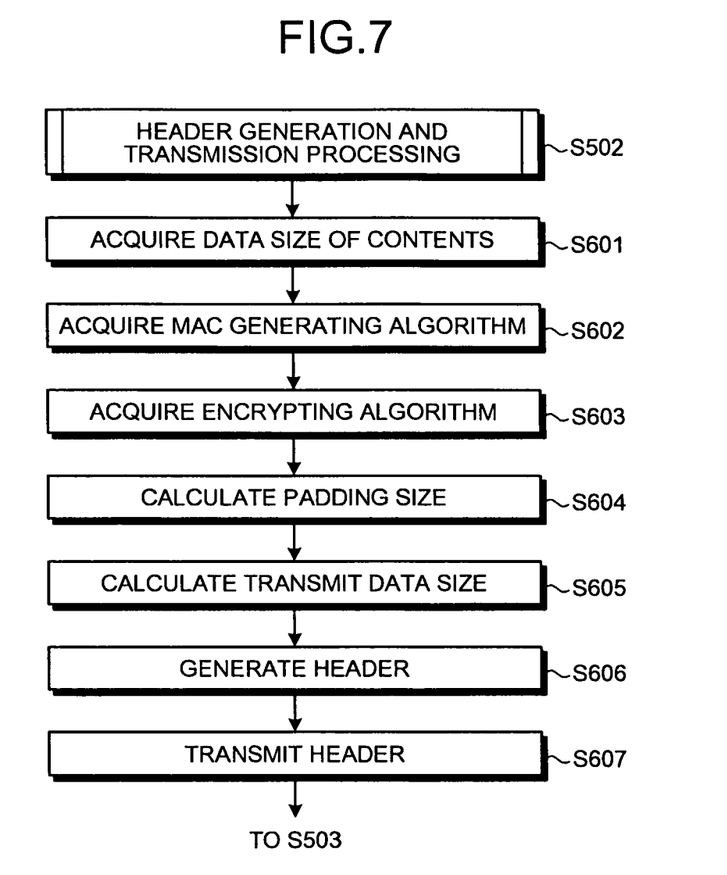
FIG. 7 is a flowchart of processing for the generation and transmission of a header of the transmit data (step S502 of FIG. 6) according to the first embodiment.

FIG. 7 is a flowchart of processing for the generation and transmission of the header of the transmit data (step S502 of FIG. 6) according to the first embodiment. As shown in the flowchart of FIG. 7, firstly, the CPU acquires the data size of the contents for which the transmission instruction has been received at step S501 of FIG. 6 (step S601). The data size of the contents is acquired, for example, by reading out the data size of the contents recorded on the HD, etc.

Next, the CPU acquires the MAC generating algorithm that generates the MAC of the contents for which the transmission instruction has been received at step S501 of FIG. 6 (step S602). The acquisition of the MAC generating algorithm may alternatively be, for example, the reading out of a hash function, etc., used inside the MAC generating algorithm that generates the MAC. The MAC data size may be determined by the hash function used inside the MAC generating algorithm.

Then, the CPU acquires the encrypting algorithm that encrypts the transmit data (step S603). The encrypting algorithm is, for example, the AES or the DES and is acquired by reading out the information stored on the ROM, etc.

Although, with respect to the flowchart of FIG. 7, description was made in the order of step S601 to step S603, the order is not to be limited thereto. Specifically, for example, these steps may be performed in parallel simultaneously or acquisition may be in the order of the encrypting algorithm, the MAC generating algorithm, and the data size of the contents.

Next, using the encrypting algorithm acquired at step S603, the contents for which the transmission instruction has been received at step S501 of FIG. 6, and the MAC generating algorithm, the CPU calculates the padding size (step S604) and calculates the transmit data size (step S605).

Using the transmit data size calculated at step S605, the CPU generates the header of the transmit data (step S606). Thereafter, the header generated at the step S606 is transmitted to the destination of the contents by way of the interface (step S607), thereby completing the header generation and transmission processing at step S502 of FIG. 6 and the process proceeds to step S503.

As described above, the first embodiment of the present invention enables generation of the header prior to the generation of the padding, the generation of the MAC, and the encryption processing of the transmit data and thereafter transmission of the transmit data and therefore, enables the memory, such as the transmitting buffer, to be used efficiently.

Specifically, by sequentially performing the generation of the transmit data, the encryption, and the transmission at a transmitting buffer of an appropriate size, efficient memory utilization can be achieved.

In the first embodiment described above, the contents to be transmitted are sequentially copied to the transmitting buffer and sent to the destination. According to the description above, at the last stage, the untransmitted contents that do not fill the block, the MAC, and the padding are copied to the transmitting buffer and transmitted to the destination. According to the second embodiment of the present invention, description is made of a configuration that includes a MAC-use buffer and transmission of the MAC from such a buffer rather than copying the MAC to the transmitting buffer.

As the hardware configuration and the functional configuration of the information transmitting apparatus according to the second embodiment of the present invention are, for the most part, the same as that shown in FIGS. 2 and 3, respectively, description thereof is omitted herein. However, according to the second embodiment, the encrypting algorithm must be able to accommodate the input of a data size not equal to a multiple of the block.

Figure 8:
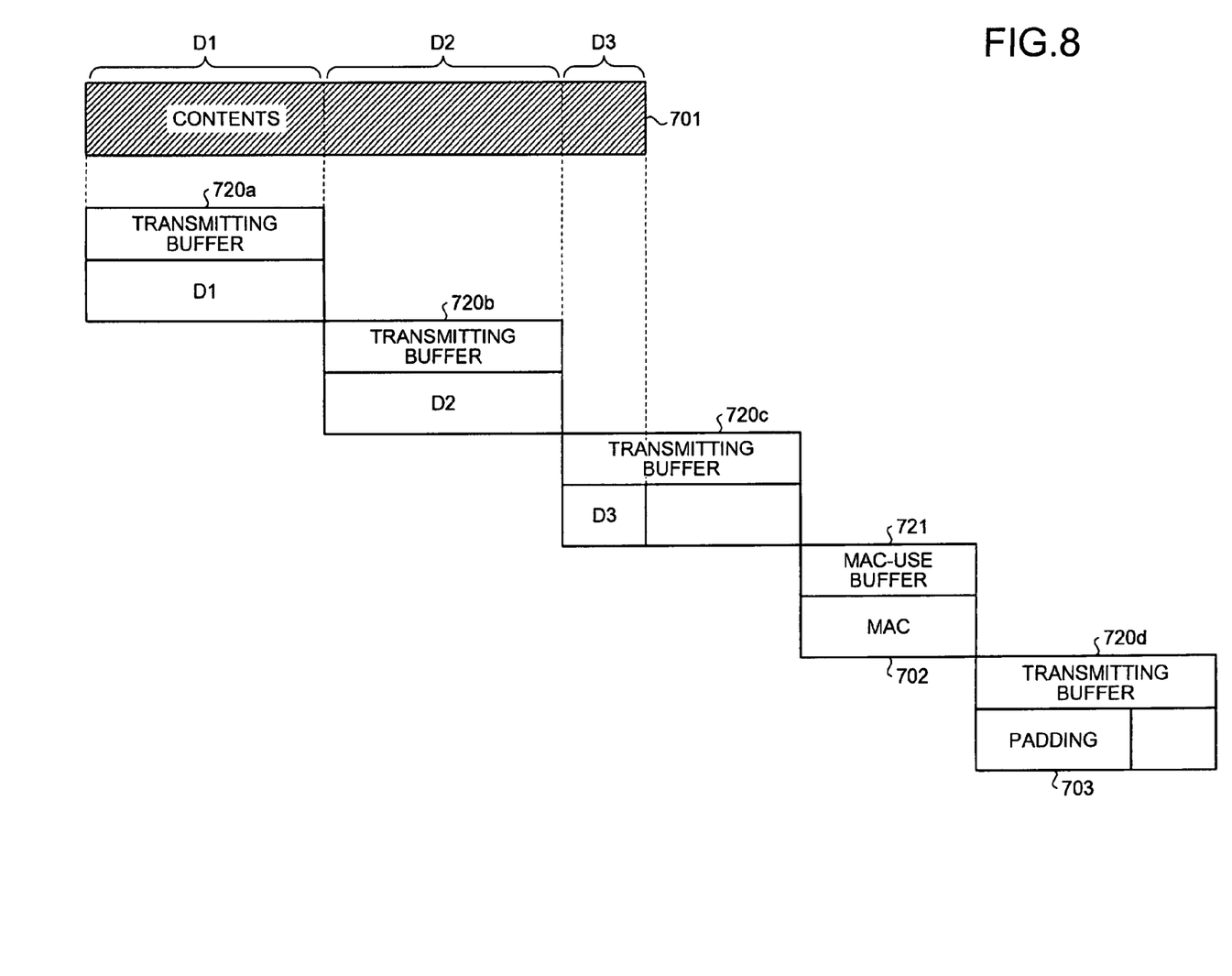
FIG. 8 is a schematic of the transmit data according to a second embodiment of the present invention.

FIG. 8 is a schematic of the transmit data according to the second embodiment of the present invention. As shown in FIG. 8, for the transmission of contents 701, the contents 701 are divided and sequentially copied to a transmitting buffer 720 (720a, 720b, 720c, 720d). Specifically, for example, the information transmitting apparatus 100 copies, to the transmitting buffer 720a, a D1 portion of the contents 701 to be transmitted and encrypts the D1 portion. Thereafter, the D1 portion is transmitted to the destination by way of the interface.

Next, a D2 portion of the contents 701 is copied to the transmitting buffer 720b and encrypted. Thereafter, the D2 portion is transmitted to the destination by way of the interface.

Then, a remaining D3 portion of the contents 701 is copied to the transmitting buffer 720c and encrypted. Thereafter, the D3 portion is transmitted to the destination by way of the interface.

Further, a MAC 702 of the contents 701 is generated in a MAC-use buffer 721, is encrypted, and is transmitted to the destination by way of the interface. With respect to the generation of the MAC 702, configuration may be such that an intermediate value will be generated for each copy of the D1 portion, D2 portion, or D3 portion to the transmitting buffer 720.

Then, padding 703 is generated in the transmitting buffer 720d and encrypted. Thereafter, the padding 703 is transmitted to the destination by way of the interface.

As described above, with the MAC-use buffer 721 and the storage the MAC 702 therein, the size of the transmitting buffer 720 is only required to be a minimum of block and efficient utilization of the memory can be realized.

Although omitted from the description with respect to FIG. 8, configuration may be such that the header is generated using the data size of the transmit data calculated from the data size of the contents, the encrypting algorithm, and the MAC generating algorithm, and is transmitted to the destination. Specifically, for example, the padding size may be calculated from the remainder of the sum the data size of the MAC and the contents divided by the block and configuration is such that the transmit data size is calculated from the data size of the contents, the padding size, and the data size of the MAC.

As described above, according to the second embodiment of the present invention, the MAC-use buffer enables transmission of the transmit data without storing the MAC in the transmitting buffer, thereby achieving a reduction in the size of the transmitting buffer.

The information transmitting method explained in the present embodiments can be implemented by a computer such as a personal computer and a workstation executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The information transmitting apparatus, the information transmitting method, and computer product according to the present invention generate a header by a calculation of the transmit data size, thereby effecting increased efficiency of memory utilization.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information transmitting apparatus that encrypts according to a given encrypting algorithm, and transmits to a destination, transmit data that includes contents for which a transmission instruction has been received, an authentication code that authenticates the contents and a sender of the contents, and padding, the apparatus comprising:

a memory; and a processor coupled to the memory, wherein the processor executes a process that includes calculating a size of the padding based on the encrypting algorithm, a size of the authentication code and a size of the contents;

calculating a size of the transmit data from the size of the padding, the size of the authentication code, and the size of the contents;

generating, using the size of the transmit data, a header that indicates a type of the transmit data and the size of the transmit data;

encrypting the transmit data after the generating of the header is completed; and transmitting, to the destination, the header and the encrypted transmit data.

2. The information transmitting apparatus according to claim 1, wherein the encrypting divides the transmit data by a block of the encrypting algorithm into a plurality of data blocks, sequentially encrypts the data blocks, and encrypts a last data block that includes the padding of a size that makes a size of the last data block equal to a size of the block, the block being smaller in size than a memory of a transmitting buffer that temporarily stores the transmit data, and the transmitting sequentially transmits, to the destination, the data blocks and the last data block sequentially encrypted by the encrypting.

3. The information transmitting apparatus according to claim 2, wherein the transmitting transmits the data blocks and the last data block after transmission of the header.

4. The information transmitting apparatus according to claim 1, wherein the calculating the size of the padding, by dividing the size of the authentication code and the size of the contents by a block of the encrypting algorithm, calculates the size of the padding such that a sum of the size of the authentication code, the size of the contents, and the size of the padding is a multiple of the block and a positive integer.

5. The information transmitting apparatus according to claim 1, wherein the size of the authentication code is determined based on a MAC generating algorithm that generates the authentication code.

6. The information transmitting apparatus according to claim 1, wherein the header is generated separately from the transmit data.

7. The information transmitting apparatus according to claim 1, wherein the header and the transmit data are separately and independently transmitted to the destination.

8. The information transmitting apparatus according to claim 1, wherein the header is used to set an appropriate size of a transmission buffer before transmission of the transmit data.

9. An information transmitting method of encrypting according to a given encrypting algorithm, and transmitting to a destination, transmit data that includes contents for which a transmission instruction has been received, an authentication code that authenticates the contents and a sender of the contents, and padding, the method comprising:

calculating, using a processor, a size of the padding based on the encrypting algorithm, a size of the authentication code and a size of the contents;

calculating a size of the transmit data from the size of the padding, the size of the authentication code, and the size of the contents;

generating, using the processor and using the size of the transmit data, a header that indicates a type of the transmit data and the size of the transmit data;

encrypting the transmit data after the generating of the header is completed; and transmitting, to the destination, the header and the encrypted transmit data.

10. The information transmitting method according to claim 9, wherein the header is generated separately from the transmit data.

11. The information transmitting method according to claim 9, wherein the header and the transmit data are separately and independently transmitted to the destination.

12. The information transmitting method according to claim 9, wherein the header is used to set an appropriate size of a transmission buffer before transmission of the transmit data.

13. A non-transitory computer-readable recording medium storing therein an information transmitting program for encrypting according to a given encrypting algorithm, and transmitting to a destination, transmit data that includes contents for which a transmission instruction is received, an authentication code that prevents the contents from being altered and a sender of the contents from being disguised as a different person, and padding, the program causing a computer to execute a process comprising:

calculating a size of the padding based on the encrypting algorithm, a size of the authentication code and a size of the contents;

calculating a size of the transmit data from the size of the padding, the size of the authentication code, and the size of the contents;

generating, using the size of the transmit data, a header that indicates a type of the transmit data and the size of the transmit data;

encrypting the transmit data after the generating of the header is completed; and transmitting, to the destination, the header and the encrypted transmit data.

14. The non-transitory computer readable medium according to claim 13, wherein the header is generated separately from the transmit data.

15. The non-transitory computer readable medium according to claim 13, wherein the header and the transmit data are separately and independently transmitted to the destination.

16. The non-transitory computer readable medium according to claim 13, wherein the header is used to set an appropriate size of a transmission buffer before transmission of the transmit data.

* * * * *